United States Patent
Heinloth et al.

(10) Patent No.: US 9,370,831 B2
(45) Date of Patent: Jun. 21, 2016

(54) METHOD AND MILLING CUTTER FOR MACHINING HARDENED CRANKSHAFTS OR CAMSHAFTS

(71) Applicants: Markus Heinloth, Postbauer-Heng (DE); Juergen Thomas Baer, Lichtenau (DE)

(72) Inventors: Markus Heinloth, Postbauer-Heng (DE); Juergen Thomas Baer, Lichtenau (DE)

(73) Assignee: KENNAMETAL INC., Latrobe, PA (US)

( * ) Notice: Subject to any disclaimer, the term of this patent is extended or adjusted under 35 U.S.C. 154(b) by 351 days.

(21) Appl. No.: 13/874,726

(22) Filed: May 1, 2013

(65) Prior Publication Data
US 2013/0294849 A1    Nov. 7, 2013

(30) Foreign Application Priority Data

May 3, 2012   (DE) .......................... 10 2012 009 097

(51) Int. Cl.
*B23C 5/20*   (2006.01)
*B23C 5/08*   (2006.01)
*B23C 3/06*   (2006.01)

(52) U.S. Cl.
CPC ... *B23C 5/20* (2013.01); *B23C 3/06* (2013.01); *B23C 5/08* (2013.01); *B23C 5/207* (2013.01); *B23C 2200/0494* (2013.01); *B23C 2200/125* (2013.01); *B23C 2200/367* (2013.01); *B23C 2222/28* (2013.01); *B23C 2224/24* (2013.01); *B23C 2228/10* (2013.01); *B23C 2228/24* (2013.01); *Y10T 407/193* (2015.01); *Y10T 407/27* (2015.01); *Y10T 409/303752* (2015.01)

(58) Field of Classification Search
CPC ............ B23C 2224/24; B23C 2224/36; Y10T 407/27
USPC .......................................... 407/119
See application file for complete search history.

(56) References Cited

U.S. PATENT DOCUMENTS

| | | | | |
|---|---|---|---|---|
| 5,431,072 A * | 7/1995 | Christoffel | ....................... | 76/115 |
| 6,629,806 B1 * | 10/2003 | Santorius | ................... | B23C 3/06 |
| | | | | 409/132 |
| 8,141,464 B2 * | 3/2012 | Shimizu | .................... | B23C 3/06 |
| | | | | 407/42 |
| 8,814,478 B2 * | 8/2014 | Baer et al. | ....................... | 407/44 |
| 2002/0021946 A1 * | 2/2002 | Emoto et al. | .................... | 407/56 |
| 2002/0176753 A1 * | 11/2002 | Kato | ............................... | 407/30 |
| 2006/0002779 A1 * | 1/2006 | Bauer et al. | ................... | 409/234 |

(Continued)

FOREIGN PATENT DOCUMENTS

| DE | 10314280 A1 * | 10/2004 | ................ B23C 3/02 |
|---|---|---|---|
| JP | 09-136210 A * | 5/1997 | ................ B23C 5/20 |

(Continued)

*Primary Examiner* — Sunil K Singh
*Assistant Examiner* — Ryan Rufo
(74) *Attorney, Agent, or Firm* — Larry R. Meenan

(57) ABSTRACT

The invention relates to a method for precision machining of crankshafts or camshafts to final dimensional tolerances $R_z < 10\,\mu m$, preferably $\leq 5\,\mu m$ and concentricity tolerances $\leq 30\,\mu m$, preferably $\leq 6\,\mu m$, which have been machined and at least partially subjected to hardening, wherein after the first machining has been carried out and subsequent hardening to 45 to 60 HRC, preferably 50 to 53 HRC, a final machining is carried out by means of at least one milling tool, wherein it is provided that the final machining is carried out by means of cutting inserts made of coated hard metal. The invention further relates to a milling tool for precision machining of crankshafts or camshafts by carrying out the method of the invention.

5 Claims, 3 Drawing Sheets

(56) References Cited

U.S. PATENT DOCUMENTS

| | | | |
|---|---|---|---|
| 2006/0115650 A1* | 6/2006 | Hanyu et al. | 428/408 |
| 2006/0165501 A1* | 7/2006 | Heinloth | 409/199 |
| 2009/0123242 A1* | 5/2009 | Heinloth et al. | 407/114 |
| 2010/0047031 A1* | 2/2010 | Schaupp | 409/131 |
| 2010/0303562 A1* | 12/2010 | Hecht | B23B 27/164 407/107 |
| 2011/0117342 A1* | 5/2011 | Sugita | B23C 5/1009 428/213 |
| 2012/0093594 A1* | 4/2012 | Kirchberger | B23C 3/06 407/42 |

FOREIGN PATENT DOCUMENTS

| | | | | |
|---|---|---|---|---|
| JP | 11-197935 A | * | 7/1999 | B23C 5/12 |
| JP | 2001-293610 A | * | 10/2001 | B23C 5/12 |
| JP | 2001-334407 A | * | 12/2001 | B23C 5/12 |
| JP | 2004-042254 A | * | 12/2004 | B23C 5/20 |
| JP | 2004-351532 A | * | 12/2004 | B23C 5/12 |
| JP | 2008-080489 A | * | 4/2008 | B23C 5/20 |

* cited by examiner

METHOD AND MILLING CUTTER FOR MACHINING HARDENED CRANKSHAFTS OR CAMSHAFTS

CLAIM TO PRIOTITY

This is a National entry application of German Application No. 102012009097.8, filed on May 3, 2012, the entire contents of which is incorporated herein by reference.

FIELD OF THE INVENTION

The invention relates to a method for precision machining of crankshafts or camshafts to final dimensions as well as a milling tool for such machining as claimed in the preamble of claim 1.

BACKGROUND OF THE INVENTION

A method and a device for the precision machining of crankshafts or camshafts to final dimensions are disclosed in DE 10 2009 030 856 A1, in which a milling tool is used which comprises cutting inserts which are provided with CBN or PCD cutting disks. Using these cutting disks, it is possible to mill hardened crankshafts or camshafts with a high degree of precision to the desired dimensions, wherein a final dimensional tolerance $R_z$<10 µm and a concentricity tolerance of <30 µm and preferably <6 µm are able to be maintained. In this case, it is possible to perform the machining by a dry cutting operation which is advantageous in that cooling lubricant contaminated with chips and grinding sludge does not have to be reprocessed or disposed of.

SUMMARY OF THE INVENTION

CBN or PCD cutting disks used in the prior art are advantageous with regard to their cutting performance. However, it is a drawback that they have to be soldered onto the cutting inserts which restricts the options of influencing the formation of chips in the desired manner.

The object of the invention is thus to develop the known method and the known tool such that the formation of chips may be influenced in the desired manner with consistently high or even improved cutting performance.

To achieve this object, it is provided according to the invention in a method of the type mentioned in the introduction that the final machining is performed with cutting inserts made of coated hard metal. In a milling tool of the type mentioned in the introduction, it is provided that the cutting inserts consist of coated hard metal. The invention is based on the recognition that when machining hardened crankshafts or camshafts, cutting performances may be achieved with cutting inserts made of coated hard metal which are at least as good as previously achieved when using CBN or PCD cutting disks, but there is more freedom of design in the manufacture of the cutting inserts in order to influence the formation of chips in the desired manner.

Preferably, it is provided that the machining is performed by means of an external or internal milling cutter which has adjustable cutting inserts. This makes it possible to move the individual cutting inserts accurately into their set position, so that a particularly high degree of machining accuracy is achieved.

According to a preferred embodiment, it is provided that the cutting inserts consist of a substrate having a particle size of K10 to K05. In other words, the substrate consists of very fine particles which assists the cutting properties required for machining hardened surfaces.

The cutting inserts may, in particular, be coated with TiAlN or TiCrN. This also ensures the desired cutting properties.

Preferably, it is provided that at least some of the cutting inserts have a plurality of cutting edges. This reduces the tolerances which are present, as different cutting edges are applied to one and the same cutting insert.

Preferably, it is provided that at least some of the cutting inserts have a cutting edge which is rounded. The edge radiusing has proved to be advantageous when machining the hardened material.

Preferably, it is provided in this case that the radius of the cutting edge radiusing is between 5 and 15 µm, i.e. is designed to be very small.

According to an embodiment of the invention, it is provided that, relative to the rotational direction of the milling tool, all of the cutting inserts are clamped thereto in the axial direction. This simplifies the provision of the milling tool with the cutting inserts.

BRIEF DESCRIPTION OF THE DRAWINGS

The invention is described hereinafter with reference to a preferred embodiment which is shown in the accompanying drawings, in which.

DETAILED DESCRIPTION OF THE INVENTION

Figure 1:
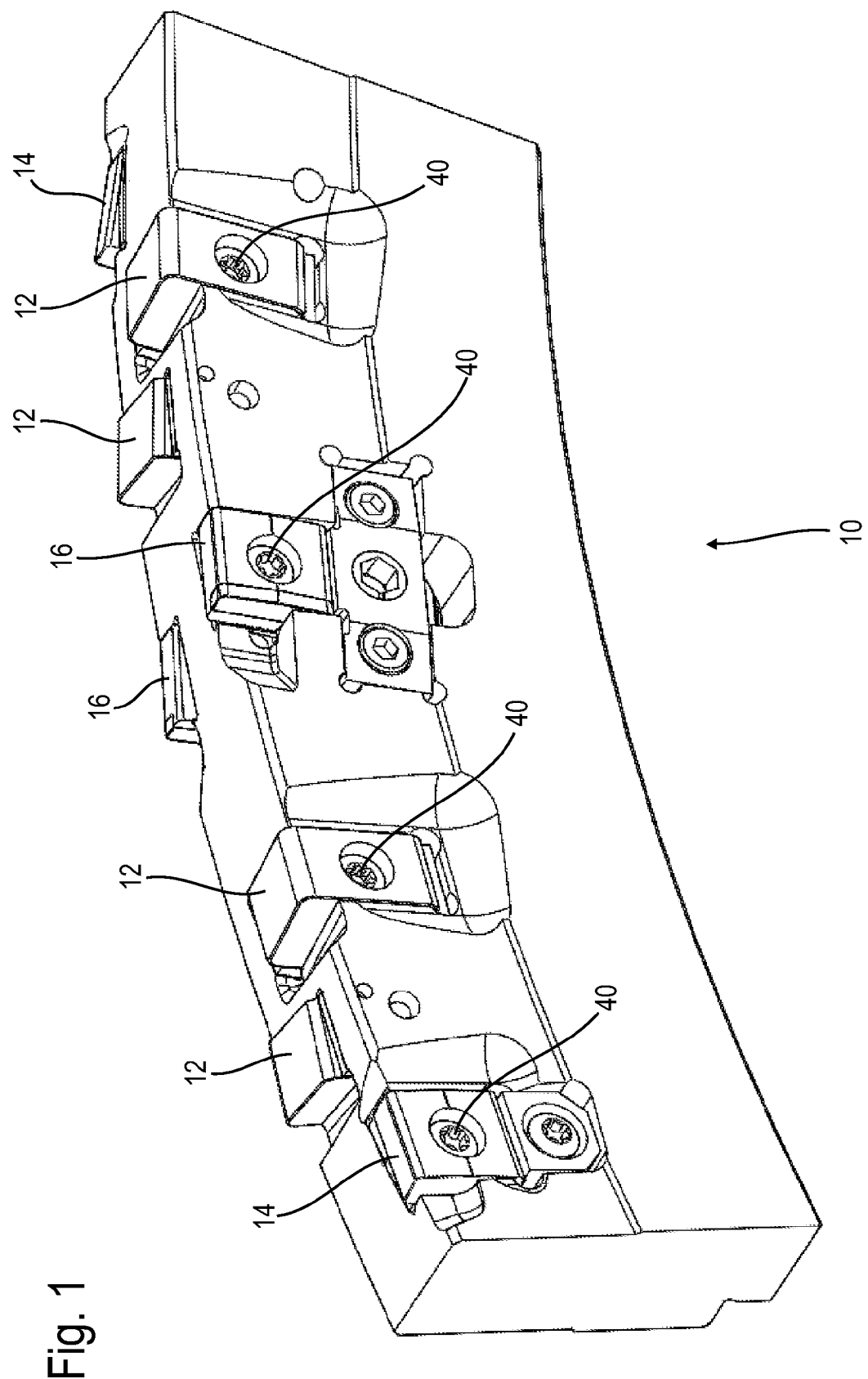
FIG. 1 shows in a perspective view a milling tool according to the invention.

In FIG. 1 a milling tool 10 is shown, said milling tool in this case being a segment of an external milling cutter which may be fixed to a support in an appropriate manner. The milling tool 10 in this case is provided with three different types of cutting inserts, namely a first type 12, a second type 14 and a third type 16.

Figure 2:
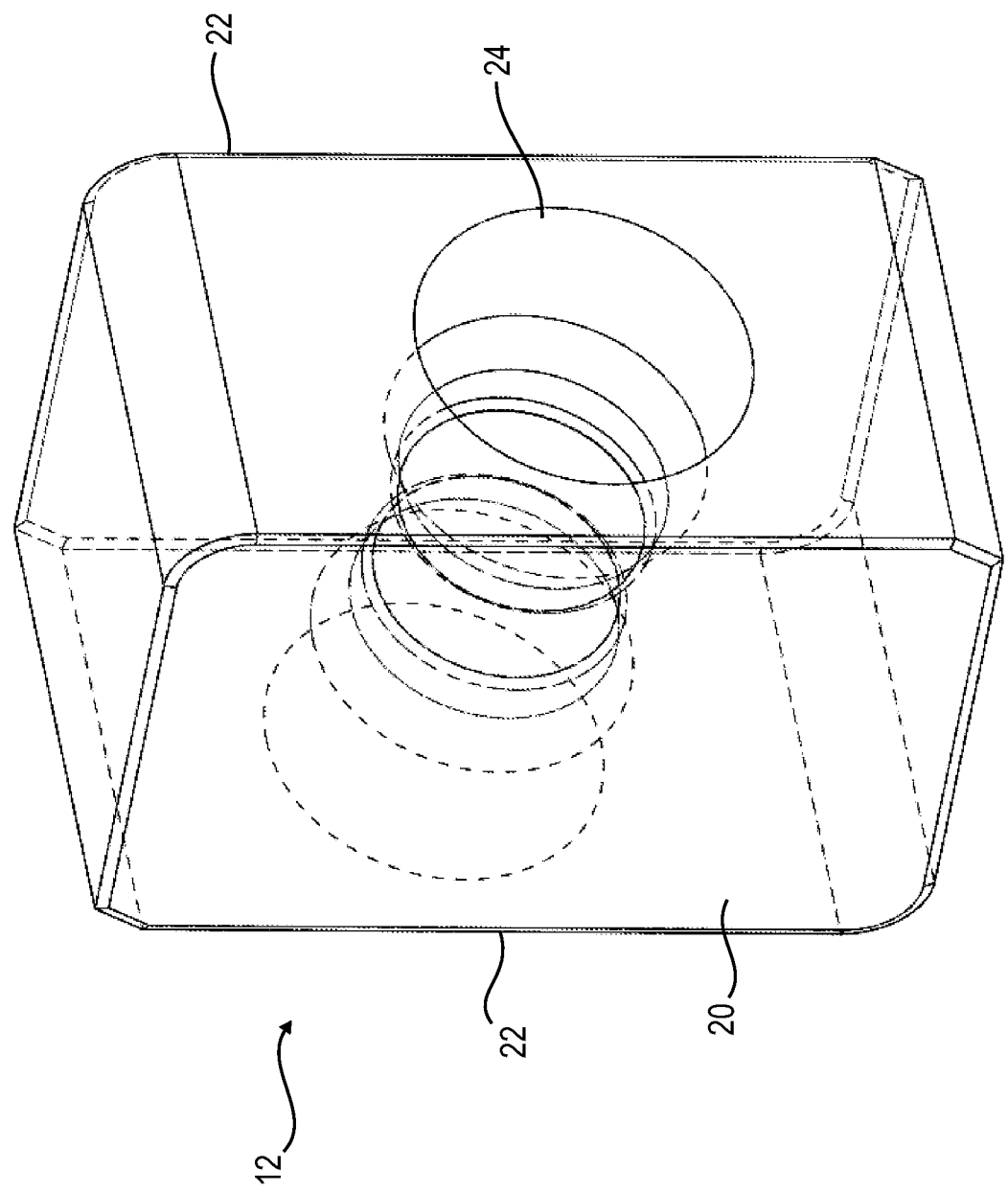
FIG. 2 shows in a schematic view a first cutting insert which is used in the milling tool of FIG. 1.

The cutting inserts 12 of the first type are generally cuboidal cutting inserts (see also FIG. 2) which are provided with two machining surfaces 20 and with a cutting edge 22 along the transition from each machining surface 20 to the side surfaces. A fastening opening 24 extends through two opposing side surfaces.

Figure 3:
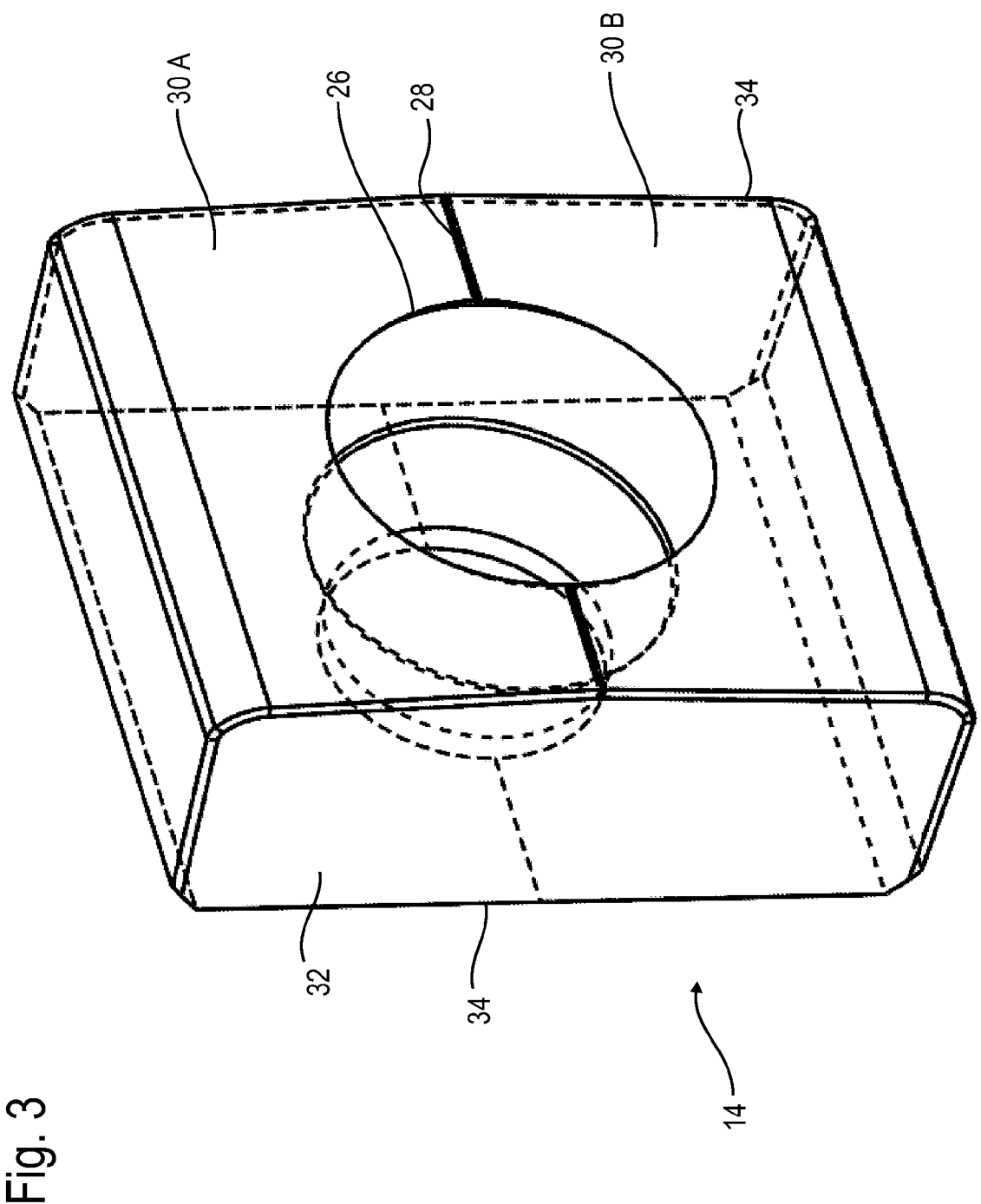
FIG. 3 shows in a schematic view a second cutting insert which is used in the milling tool of FIG. 1.

The cutting inserts 14 of the second type also have a generally cuboidal base body (see FIG. 3), wherein the side surfaces provided with a fastening opening 26 in each case do not extend in one plane but are slightly inclined. In this manner, level with the center of the fastening opening 26, a transition edge 28 is produced between two partial surfaces 30A, 30B which together form one of the side surfaces of the cutting insert 14. Furthermore, the cutting insert 14 of the second type has two machining surfaces 32 which at the transition with the side surfaces of the cutting insert 14 in each case define a peripheral cutting edge 34.

The cutting inserts 12, 14 of the first and the second type consist of hard metal, the substrate thereof having a particle size of K10 to K05.

The cutting inserts 12, 14 are coated and namely preferably with TiAlN or TiCrN.

The cutting edges 22, 34 are rounded and namely with a very small radius in the order of magnitude of 5 to 15 µm.

The cutting inserts 16 of the third type are cutting inserts which are provided with small cutting disks made of CBN or PCD.

The cutting inserts 12, 14, 16 are arranged along the external periphery of the milling tool 10, wherein they are oriented so that they are clamped by means of fastening screws 40 which are oriented in the axial direction, i.e. the central axis thereof extends substantially parallel to the central axis of the milling cutter, on which the milling tool 10 is mounted. If desired, the cutting inserts 12, 14, 16 may be mounted in a cassette which is adjustably fastened to the milling tool 10.

The particular advantage of using cutting inserts 12, 14 of the first and the second type is that the cutting edges 22, 34 are designed so that it is possible to machine hardened material. The criteria are dictated by the service life and accuracy.

The advantage achievable by the edge radiusing is, in particular, that an optimum is achieved between stabilizing the cutting edge and preventing too much thermal input into the machining process.

In order to influence the formation of chips in the desired manner, it is provided, in particular, that the machining angle with the cutting edge radiusing is optimally adapted to the fiber geometry and the corresponding corner radius.

What is claimed is:

1. A milling tool for precision machining of crankshafts or camshafts using three different types of cutting inserts arranged along an external periphery of the milling tool, wherein the first type of cutting insert is coated with TiAlN or TiCrN and includes a generally cuboidal base body made of a coated hard material with two machining surfaces and a cutting edge along a transition from each machining surface to two opposing side surfaces, and a fastening opening extending through the two opposing side surfaces such that the first type of cutting insert is mounted on a surface that is substantially perpendicular to an axis of rotation of the milling tool, and wherein the second type of cutting insert is coated with TiAlN or TiCrN and includes a generally cuboidal base body made of a coated hard material with two machining surfaces and a cutting edge along a transition from each machining surface to the two opposing side surfaces, and a fastening opening extending through two opposing side surfaces such that the second type of cutting insert is mounted on a surface that is substantially perpendicular to the axis of rotation of the milling tool, and wherein one of the two opposing side surfaces is formed with two partial surfaces inclined at a non-zero angle with respect to each other separated by a transition edge passing through a center of the fastening opening, and wherein the third type of cutting insert is coated with cubic boron nitride (CBN) or polycrystalline diamond (PCD), and wherein the third type of cutting insert is mounted on a surface that is substantially perpendicular to the axis of rotation of the milling tool, and wherein the cutting inserts are secured to the milling tool by a fastening screw, and wherein a central axis of the fastening screw is substantially parallel to the axis of rotation of the milling tool.

2. The milling tool as claimed in claim 1, wherein the first and second type of cutting inserts consist of a substrate having a particle size of K10 to K05.

3. The milling tool as claimed in claim 1, wherein at least some of the cutting edges of the first and second type of cutting inserts is rounded.

4. The milling tool as claimed in claim 3, wherein the radius of the cutting edge is between 5 and 15 μm.

5. The milling tool as claimed in claim 1, wherein at least some of the cutting inserts are mounted on a cassette for adjusting an axial position of the cutting insert.

* * * * *